US012704011B2

(12) United States Patent
Lopez et al.

(10) Patent No.: US 12,704,011 B2
(45) Date of Patent: Aug. 11, 2026

(54) RETAINING DEVICE

(71) Applicant: Edscha Engineering GmbH, Remscheid (DE)

(72) Inventors: Luis Lopez, Santander (ES); Manuel Moreno, Barrio Naveda (ES); Carlos Ventura, Santander (ES)

(73) Assignee: Edscha Engineering GmbH, Remscheid (DE)

( * ) Notice: Subject to any disclaimer, the term of this patent is extended or adjusted under 35 U.S.C. 154(b) by 12 days.

(21) Appl. No.: 18/890,731

(22) Filed: Sep. 19, 2024

(65) Prior Publication Data

US 2025/0101782 A1 Mar. 27, 2025

(30) Foreign Application Priority Data

Sep. 22, 2023 (EP) .................................... 23199249

(51) Int. Cl.

*E05D 11/06* (2006.01)
*E05D 3/02* (2006.01)
*E05D 5/06* (2006.01)
*E05D 11/10* (2006.01)

(52) U.S. Cl.

CPC ............ *E05D 11/1014* (2013.01); *E05D 3/02* (2013.01); *E05D 5/062* (2013.01); *E05Y 2201/224* (2013.01); *E05Y 2201/628* (2013.01); *E05Y 2900/531* (2013.01)

(58) Field of Classification Search

CPC ......... E05Y 2900/531; E05Y 2201/224; E05Y 2201/628; E05Y 16/374; E05Y 16/82; E05D 5/062; E05D 5/128; E05D 3/02; E05D 11/1042; E05D 11/1014; E05D 11/1057; E05D 11/1085; E05F 1/1238

See application file for complete search history.

(56) References Cited

U.S. PATENT DOCUMENTS 2,259,821 A * 10/1941 Johnson .................. E05D 11/06 16/375
6,334,236 B1 * 1/2002 Kalliomaki ......... E05D 11/1057 16/83

(Continued)

FOREIGN PATENT DOCUMENTS

EP 3392436 A1 * 10/2018 ............... E05D 5/12
EP 1561890 A1 6/2022

(Continued)

*Primary Examiner* — Chuck Y Mah
(74) *Attorney, Agent, or Firm* — Davidson Kappel LLC

(57) ABSTRACT

A retaining device for a temporary connection to a hinge having an axis of rotation, including a holder assigned to a hinge member of the hinge. The holder includes a curved elongated hole and an eye. The eye is concentrically arranged to the axis of rotation. The eye includes an inner circumference for receiving a bolt defining the axis of rotation. The holder is configured as a one-piece part. The holder is detachable from the hinge and has a first side facing the hinge member. At least one projection extends from the first side of the holder and to an automobile hinge and to a method. A retaining device, an automobile hinge and a method provided by the at least one projection arranged directly adjacent to the inner circumference of the eye of the holder.

18 Claims, 4 Drawing Sheets

(56) References Cited

U.S. PATENT DOCUMENTS

| | | | | |
|---|---|---|---|---|
| 2003/0140455 | A1 * | 7/2003 | Audisio | E05C 21/005 16/334 |
| 2004/0025294 | A1 * | 2/2004 | Gruber | E05D 7/1044 403/14 |
| 2011/0083301 | A1 * | 4/2011 | Folk | E05D 11/1014 16/349 |
| 2022/0235592 | A1 * | 7/2022 | Gutierrez-Fernandez | E05D 11/1014 |

FOREIGN PATENT DOCUMENTS

| | | | | |
|---|---|---|---|---|
| EP | 4008869 | A1 | 6/2022 | |
| EP | 4155494 | A1 * | 3/2023 | E05D 11/1014 |
| FR | 2751019 | A1 * | 1/1998 | E05C 21/005 |
| FR | 2910044 | A1 * | 6/2008 | E05D 11/1042 |
| FR | 2916471 | A1 | 11/2008 | |
| FR | 3032679 | A1 * | 8/2016 | E05D 11/1057 |
| FR | 3050477 | A1 * | 10/2017 | E05D 11/1014 |

* cited by examiner

RETAINING DEVICE

The present disclosure relates to a retaining device for a temporary connection to a hinge. The present disclosure also relates to an automobile hinge. The present disclosure further relates to a method for temporarily connecting a retaining device to an automobile hinge.

BACKGROUND

During the manufacture of automobiles, an automobile body and automobile doors are typically painted together in a single process step after the automobile doors have been mounted on the body. It is desirable to lock automobile doors temporarily held in an open position so that specific painting work, e.g. a topcoat finish, can be performed.

EP 1 561 890 A1 shows a retaining device for temporary connection to a hinge having an axis of rotation, comprising a holder assigned to a hinge member of the hinge, the holder comprising a curved elongate hole and an eye concentric to the axis of rotation, wherein the eye has a circumference for receiving a bolt defining the axis of rotation, wherein the holder is configured as an one-piece part detachable from the hinge and having a first side facing the hinge member, and wherein the holder comprises a folded portion, which can be inserted into a recess of an adjacent hinge member, so that this coupling generates an anti-rotation connection between the holder and the adjacent hinge member.

FR 2 916 471 A1 shows a retaining device for temporary connection to a hinge having an axis of rotation, comprising a holder assigned to a hinge member of the hinge, the holder comprising a curved elongate hole and an eye concentric to the axis of rotation, wherein the eye has an inner circumference for receiving a bolt defining the axis of rotation, wherein the holder is configured as a one-piece part detachable from the hinge and having a first side facing the hinge member, and wherein at least one projection extends from the first side.

EP 4 008 869 A1 shows a retaining device for temporary connection to a hinge having an axis of rotation, comprising a holder assigned to a hinge member of the hinge, the holder comprising a curved elongate hole and an eye concentric to the axis of rotation, wherein the eye has an inner circumference for receiving a bolt defining the axis of rotation, wherein the holder is configured as a one-piece part detachable from the hinge and having a first side facing the hinge member, and wherein at least one projection extends from the first side.

SUMMARY

An object of the present disclosure is to provide a retaining device, an automobile hinge and a method which are reliable, safe and cost-efficient.

One of the objects is achieved by a retaining device according to the present disclosure, by an automobile hinge according to the present disclosure and by a method according to the present disclosure, respectively.

According to an aspect of the present disclosure, there is provided a retaining device for a temporary connection to a hinge having an axis of rotation, comprising a holder assigned to a hinge member of the hinge, wherein the holder comprises a curved elongate hole and an eye, wherein said eye is concentrically arranged to the axis of rotation, wherein the eye comprises an inner circumference for receiving a bolt defining the axis of rotation, wherein the holder is configured as a one-piece part, wherein said holder is detachable from the hinge, wherein said holder having a first side facing the hinge member, wherein at least one projection extends from the first side of said holder, and wherein the at least one projection is arranged directly adjacent to the inner circumference of the eye of said holder.

According to an aspect of the disclosure, a retaining device for a temporary connection to a hinge having an axis of rotation is created. The retaining device comprises a holder assigned to a hinge member of the hinge, the holder comprising a curved elongate hole and an eye concentric to the axis of rotation, wherein the eye has a circumference for receiving a bolt defining the axis of rotation, wherein the holder is configured as a one-piece part detachable from the hinge and having a first side facing the hinge member. The retaining device is characterized in that at least one projection extends from the first side, and that the at least one projection is arranged directly adjacent to the circumference of the eye. Advantageously, the at least one projection increases the friction between the hinge member and the holder, so that the holder is arranged at least frictionally on the hinge member, wherein the holder advantageously comprises an integrated anti-twist protection.

The at least one projection has expediently a wall which at least partially axially prolongs a circumference of the eye. Advantageously, a contact surface between a bolt which can be inserted in the eye and the circumference of the eye is increased, so that a displacement of the holder about a horizontal axis is made more difficult.

Advantageously, the holder has more than two projections, wherein the projections are arranged along a circle, wherein the projections are evenly spaced from each other, wherein the projections and the first side are arranged perpendicular to each other, and wherein the projections each have a height parallel to the axis of rotation of 0.1 mm to 1.0 mm, preferably of 0.2 mm to 0.6 mm and particularly preferably 0.5 mm. Advantageously, all projections have the same height so that the holder rests flat on the hinge member or on the counterpart. Furthermore, friction is advantageously increased by the presence of several projections so that the holder cannot perform any undesired displacement.

The first side with the at least one projection is preferably configured, at least in sections, as a die stamp for deforming an at least mostly closed ring surface of an opposite material portion. Advantageously, the projections are suitable as a kind of embossing tool for pressing an impression into a mating part, which has a softer material than the holder, so that the holder is frictionally and form-fittingly locked in the mating part.

The elongate hole has expediently at least one cross-sectional constriction, wherein at least one holding position is defined in the elongate hole, and wherein at least one breakthrough is arranged between the elongate hole and the eye. Advantageously, at least one stop position is defined via the constriction so that a vehicle door is held open in an open stop position during the painting process. Furthermore, the constriction is advantageously designed to be elastic via the breakthrough, so that the constriction is widened above a certain force and a stop pin can move further within the elongate hole, so that the vehicle door can be closed and opened again.

According to a preferred embodiment, the holder is configured as a flat corpus which has a second side opposite the first side, the second side facing away from the hinge member, wherein the first side and the second side are arranged parallel to one another, and that the first side and the second side are connected to one another at least in sections via an outer circumferential lateral area. The holder is advantageously flat and compact with a height of about 2 mm to 6 mm, wherein the holder has a low weight, and wherein the holder is stackable.

The holder is preferably configured as a stamping made of sheet metal, in particular of a heat treatable steel. In order to achieve a certain hardness and durability of the holder, the holder is preferably made of a heat-treatable steel, e.g. C45E or 58CrV4, wherein the holder has a hardness between 56 and 62 HRC. Furthermore, the holder can be easily and economically manufactured using a stamping process, which saves time and costs.

Use of the retaining device is preferably provided during painting for fixing an automobile door in at least one preferred opening position. Advantageously, the holder is used for a painting process of an automobile body-in-white to hold a flap in a desired open position so that the body-in-white can be completely painted. Furthermore, the holder can advantageously be reused for further painting processes of further automobile bodies, so that costs can be saved.

According to an aspect of the present disclosure, there is provided an automobile hinge, comprising a first hinge member attachable to one of a body and a door of an automobile; and a second hinge member attachable to the other of the body and the door of said automobile; and a bolt which is connected to one of the first hinge member and the second hinge member in a rotationally fixed manner, wherein the other of said first hinge member and said second hinge member is pivotable about an axis of rotation defined by the bolt with respect to the one of said first hinge member and said second hinge member, wherein the other of said first hinge member and said second hinge member comprises at least one cantilever in which an opening is arranged, wherein a stop pin is arranged on a surface of the cantilever, wherein at least one projection of a retaining device for a temporary connection to a hinge is connectable to one of the first hinge member and the second hinge member in a rotationally fixed manner, and wherein the stop pin is accommodatable in an curved elongate hole of said retaining device in a movable manner.

According to an aspect of the disclosure an automobile hinge is created. The automobile hinge comprises a first hinge member attachable to one of a body and a door of an automobile, and a second hinge member attachable to the other of the body and the door of said automobile, and a bolt which is connected to one of the first hinge member and the second hinge member in a rotationally fixed manner, wherein the other of said first hinge member and said second hinge member is pivotable about an axis of rotation defined by the bolt with respect to the one of said first hinge member and said second hinge member, wherein the other of said first hinge member and said second hinge member comprises at least one cantilever in which an opening is arranged, and wherein a stop pin is arranged on a surface of the cantilever. The automobile hinge is characterized by the retaining device according to one of the above-mentioned features, wherein the at least one projection is connected to one of the first hinge member and the second hinge member in a rotationally fixed manner, and the stop pin is accommodated in the elongate hole in a movable manner. Advantageously, the holder always remains in a defined position by means of this arrangement, so that a pin only moves within the elongate hole as soon as the automobile door is opened or closed. In this way, the pin and the holder can be used to provide a defined open position for the automobile door, which is necessary for the painting process.

The one of said first hinge member and said second hinge member expediently has an axial bearing portion with a conical outside surface, and wherein the opening is configured as a conical opening which is complementary with respect to the conical outside surface and is connected in an articulated manner to the conical outside surface. The first hinge member and the second hinge member are advantageously connected to each other in an articulated manner. Here, both hinge members have complementary cone-like connecting elements that advantageously simplify the assembly of the automobile door to the automobile body.

The axial bearing portion with a conical outside surface preferably has a bore with, at least in sections, an internal thread, into which the bolt having an external thread is screwed in a manner such that a shaft of said bolt passes through the eye of the holder, and an area assigned to a head of said bolt extending radially beyond the eye couples in a rotationally fixed manner the at least one projection of the holder with the axial bearing portion. In this case, the holder is connected to the bearing portion by the bolt in a force-locking manner by means of surface pressure. On the other hand, the projections of the holder are pressed into the bearing portion so that the bearing portion is at least partially plastically deformed by the projections creating recesses in the bearing portion in which the projections are arranged, thus producing a form-fitting connection between the holder and the bearing portion. Advantageously, the holder is clamped in a sandwich-like manner between a head of the bolt or a washer and one hinge member, wherein this connection advantageously is a screw connection that can be easily loosened to remove the holder after the painting process.

According to an aspect of the present disclosure, a method for temporarily connecting a retaining device to an automobile hinge, comprising the steps of: Arranging an eye of a holder of the retaining device concentrically to a bore of a bearing portion of a hinge member of the automobile hinge; Inserting a bolt through the eye and the bore and connecting the bolt to the bearing portion in a detachable manner; and Applying a pre-adjustable force to the bolt to temporarily couple the holder to the bearing portion in a rotationally fixed manner.

According to an aspect of the disclosure, a method for temporarily connecting a retaining device to an automobile hinge is created. The method comprises the steps of: Arranging an eye of a holder of the retaining device concentrically to a bore of a bearing portion of a hinge member of the automobile hinge; Inserting a bolt through the eye and the bore and connecting the bolt to the bearing portion in a detachable manner; and Applying a pre-adjustable force to the bolt to temporarily couple the holder to the bearing portion in a rotationally fixed manner. Advantageously, a simple attachment of the holder to the hinge is possible with an automobile door already mounted to an automobile body. Furthermore, the holder can advantageously be removed via the screw connection without disassembling the automobile door from the automobile body, thereby saving time and costs.

The bore of the bearing portion advantageously has an internal thread, wherein the bolt has an external thread which is complementary with respect to the internal thread of the bore of the bearing portion, and wherein the bolt is connectable to the bearing portion of the hinge member by applying a torque of between 10 Nm and 40 Nm, preferably between 15 Nm and 35 Nm and particularly preferably 30 Nm to the bolt. Advantageously, the bolt can simply be screwed in using a torque wrench with a defined tightening torque.

The holder expediently comprises at least one projection which penetrates into at least a material portion of the bearing portion of the hinge member, and wherein the at least one material portion of the bearing portion is plastically deformed by the at least one projection of the holder. At a certain tightening torque, the holder is pressed together with the opposite hinge part so that the projections press into the soft material, creating a frictional and form-fitting connection between the holder and the hinge member. In this case, the holder is connected to the bearing portion by the bolt in a force-locking manner by means of surface pressure. On the other hand, the projections of the holder are pressed into the bearing portion so that the bearing portion is at least partially plastically deformed by the projections creating recesses in the bearing portion in which the projections are arranged, thus producing a form-fitting connection between the holder and the bearing portion.

The method preferably comprises a holder of a retaining device and/or an automobile hinge which are configured according to one of the above-mentioned features. Advantageously, this method is applicable by means of the retaining device according to the present disclosure and the automobile hinge according to the present disclosure.

Further advantages and developments of the present disclosure will emerge from the following description of a preferred embodiment and from the dependent claims.

BRIEF SUMMARY OF THE DRAWINGS

The present disclosure is explained in more detail below with reference to the accompanying drawings using a preferred embodiment.

DETAILED DESCRIPTION

Figure 1:
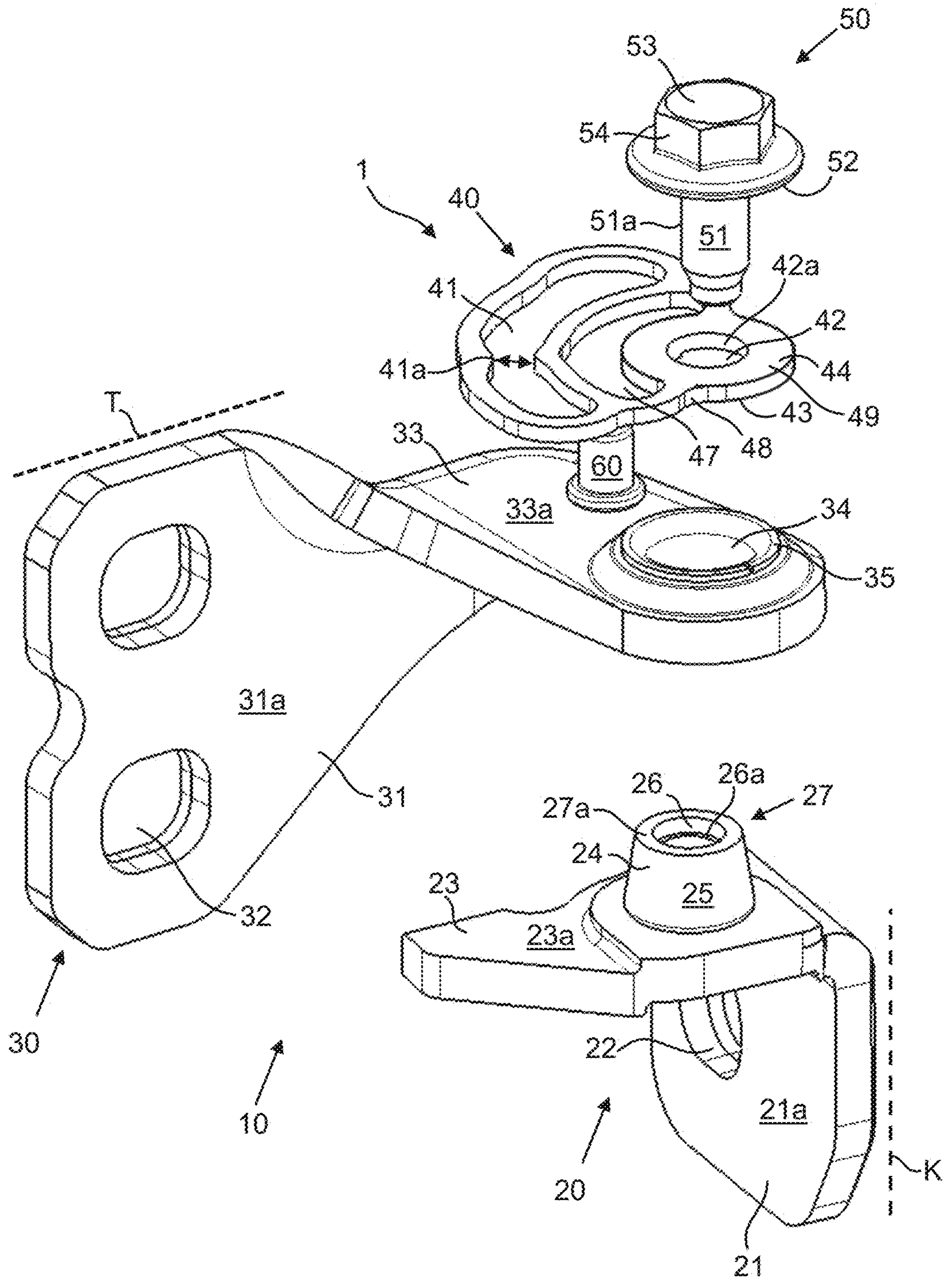
FIG. 1 is an exploded assembly drawing of an automobile hinge with a retaining device according to a preferred embodiment.

FIG. 1 shows an exploded assembly view of an automobile hinge 10 with a retaining device 1 for a temporary connection to the automobile hinge 10. The automobile hinge 10 comprises a first hinge member 20 attachable to a body K of an automobile, and a second hinge member 30 attachable to a door T of the automobile, wherein both body K and door T are illustrated as a dashed line.

The first hinge member 20 has a fastening portion 21 with a first plane 21*a* in which a mounting hole 22 is arranged for connecting the first hinge member 20 to the body K by means of riveting and/or screwing, for example. Furthermore, the first hinge member 20 comprises a cantilever 23 with a second plane 23*a*, wherein the first plane 21*a* of the fastening portion 21 is perpendicular to the second plane 23*a* of the cantilever 23. The first hinge member 20 further comprises an axial bearing portion 24 with a conical outside surface 25, wherein the bearing portion 24 is configured as a truncated cone, wherein the bearing portion 24 is arranged on the cantilever 23 of the first hinge member 20, and wherein the bearing portion 24 extends from the cantilever 23 of the first hinge member 20 in a direction away from the fastening portion 21 of the first hinge member 20. The bearing portion 24 has a material portion 27 with a ring surface 27*a* facing away from the cantilever 23 of the first hinge member 20. Furthermore, the ring surface 27*a* is arranged parallel to the second plane 23*a*. The bearing portion 24 further comprises along an axial axis a cylindrical bore 26 with an internal thread 26*a* for receiving a bolt 50 with a cylindrical shaft 51 with a complementary external thread 51*a*. Furthermore, the bolt has a tool appendix 54 which is configured as a hexagonal head.

The second hinge member 30 has a fastening portion 31 with a first plane 31*a* in which two mounting holes 32 are arranged for connecting the second hinge member 30 to the door T by means of riveting and/or screwing, for example. Furthermore, the second hinge member 30 comprises a cantilever 33 with a second plane 33*a*, wherein the first plane 31*a* of the fastening portion 31 is perpendicular to the second plane 33*a* of the cantilever 33 of the second hinge member 30. Moreover, the cantilever 33 of the second hinge member 30 comprises an opening 34, which is configured as a conical opening 34*a* in which a conically shaped bushing 35 is arranged. The second hinge member 30 further comprises an axial cylindrical stop pin 60, wherein the stop pin 60 is arranged on the cantilever 33 of the second hinge member 30, and wherein the stop pin 60 extends from the cantilever 33 of the second hinge member 30 in a direction away from the second plane 33*a* of the cantilever 33 of the second hinge member 30.

Furthermore, a holder 40 defining the retention device 1 is shown having a lower first side 43 facing the hinge 10 and an opposite upper second side 44. The holder 40 is manufactured as a flat piece from a sheet of metal, wherein the holder 40 is produced by means of a stamping process, wherein the material of the holder 40 is a quenched and tempered steel of increased hardness. The first side 43 and the second side 44 are formed flat and parallel, wherein the first side 43 and the opposite second side 44 are joined together by an outer circumferential lateral area 48, wherein the lower first side 43 of the holder 40 faces the cantilever 33 of the hinge member 30. The holder 40 further comprises a cylindrical eye 42 having an inner circumference 42*a*, wherein the eye is surrounded by a flat material ring portion 49. Further, the holder 40 comprises a curved elongate hole 41 having a constriction 41*a* which is lockable with the stop pin 60, after which the stop pin 60 is slidably disposable in the elongate hole 41. A breakthrough 47 is arranged between the elongate hole 41 and the eye 42 so that the constriction 41*a* is elastically deformable. Moreover, the eye 42 has an inner diameter slightly larger than an outer diameter of the shaft 51 of the bolt 50.

Figure 2:
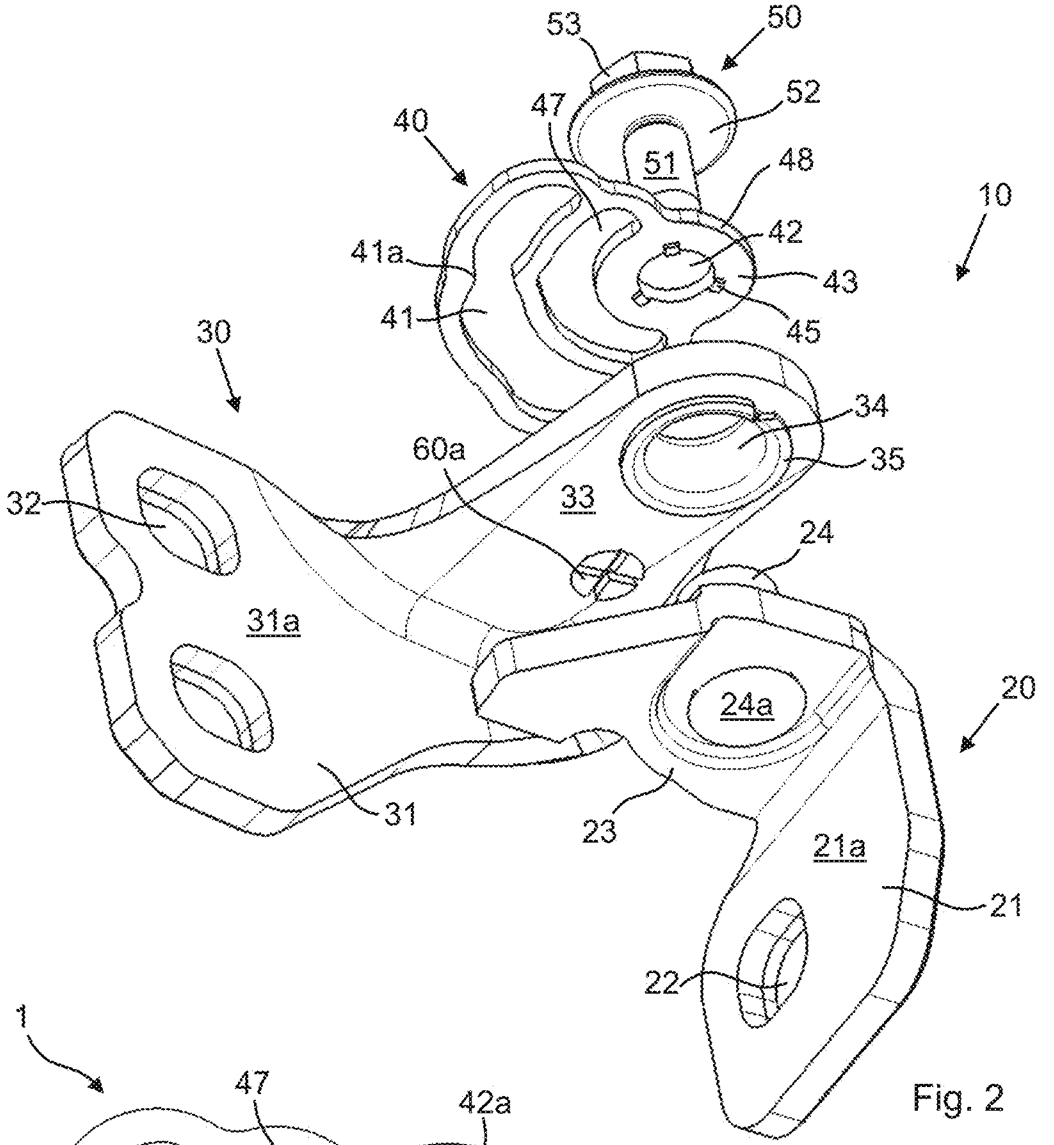
FIG. 2 is an exploded assembly drawing with a view from below of FIG. 1.

FIG. 2 shows the exploded view of FIG. 1 from a bottom perspective, wherein the lower first side 43 of the holder 40 is visible, wherein three projections 45 are arranged offset from each other immediately adjacent to the eye 42 of the holder 40. Furthermore, a fixing portion 60*a* of the stop pin 60 is visible, wherein the stop pin 60 is riveted to the cantilever 33 of the second hinge member 30. Furthermore, a fixing portion 24*a* of the bearing portion 24 is visible, wherein the bearing portion 24 is riveted to the cantilever 23 of the first hinge member 20.

Figure 3:
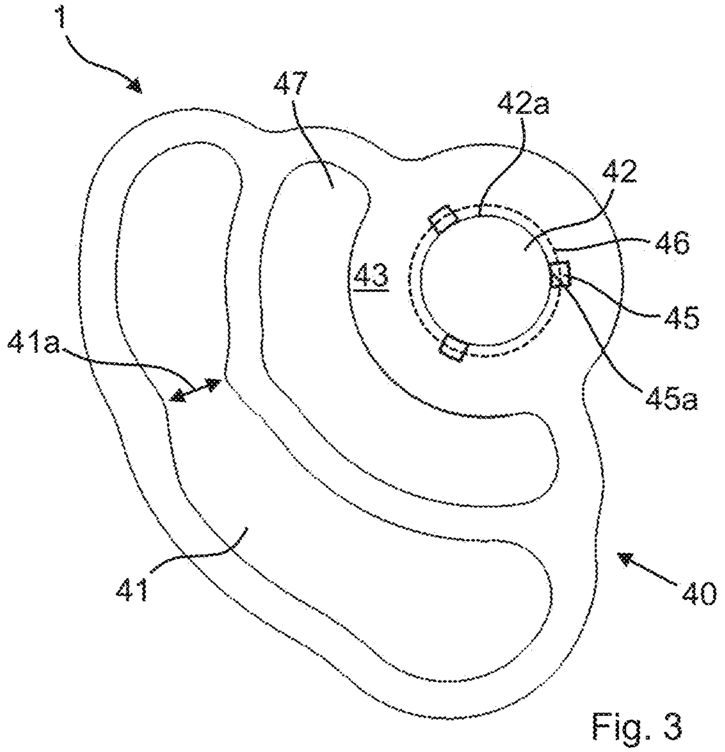
FIG. 3 is a bottom view of a first side of the retaining device.

FIG. 3 shows a bottom view of the lower first side 43 of the holder 40, wherein the arrangement of the three projections 45 is shown. The three projections 45 are arranged immediately adjacent to the inner circumference 42*a* of the eye 42, wherein one wall 45*a* of each of the projections 45 is configured to be flush with the circumference 42*a* and extends the circumference 42*a* in sections. Furthermore, the projections 45 are arranged along a concentric circle 46 with respect to the eye 42, wherein adjacent projections 45 enclose a common angle of ca. 120°. Here, the concentric circle 46 is shown as a dashed line. The projections 45 have a substantially rectangular cross-sectional shape, wherein only the wall 45*a* of each projection 45 corresponding to the circumference 42*a* of the circle 46 is curved, and wherein edges of the projections 45 are each sharp-edged. A height of the projections 45 in this embodiment example is 0.5 mm, respectively, wherein the height of the projections 45 defines a length extending from the lower first side 43 in an outward direction. As a result, the lower first side 43 corresponds to a base surface of each of the projections 45.

Figure 4:
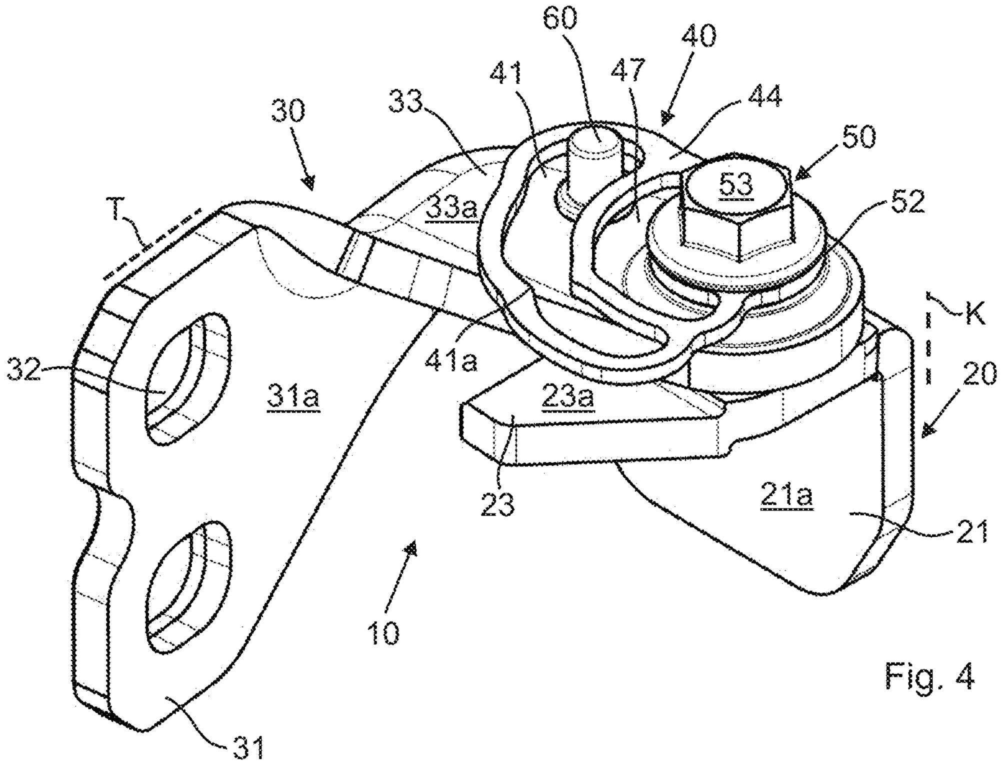
FIG. 4 is a perspective view of the assembled automobile hinge with the retaining device of FIGS. 1 to 3.

FIG. 4 shows a perspective view of the assembled automobile hinge 10 with the holder 40 attached to the first hinge member 20. Here, the first hinge part 20 is rigidly connected to the body K of the automobile, with the holder 40 being pressed to the first hinge part 20 via the bolt 50 or via its area 52, so that the holder 40 and the first hinge part 20 are connected to each other in a rotationally fixed manner. When the door T, to which the second hinge part 30 is attached, is opened, the stop pin 60 in the elongate hole 41 of the holder 40 is displaced so that a maximum door opening is predetermined by the elongate hole 41 of the holder 40. Further, the door T is held in an open position insofar as the pin 60 has passed the constriction 41*a* of the elongate hole 41 of the holder 40. As a result, the second hinge part 30 is pivotally connected to the first hinge part 20 as well as pivotally arranged with respect to the holder 40, wherein the elongate hole 41 of the holder 40 provides a defined opening angle of the door T by means of the stop pin 60.

Figure 5:
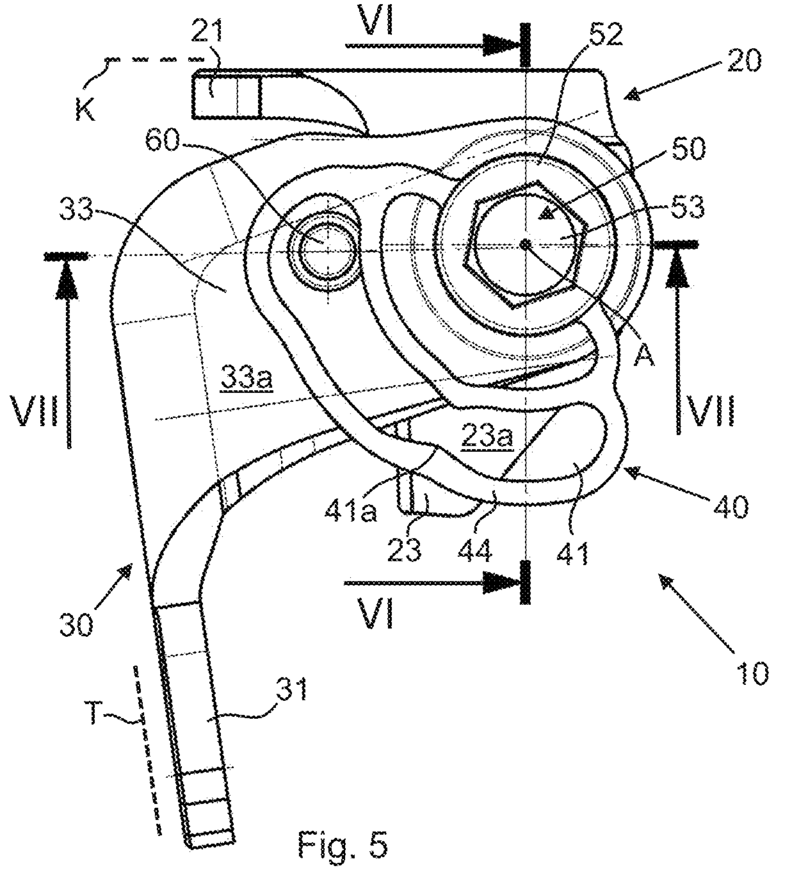
FIG. 5 is a top view of the automobile hinge with the retaining device of FIGS. 1 to 4.

FIG. 5 shows a top view of the assembled automobile hinge 10 of FIG. 4 with a first cut line VI-VI and a second cut line VII-VII.

Figure 6:
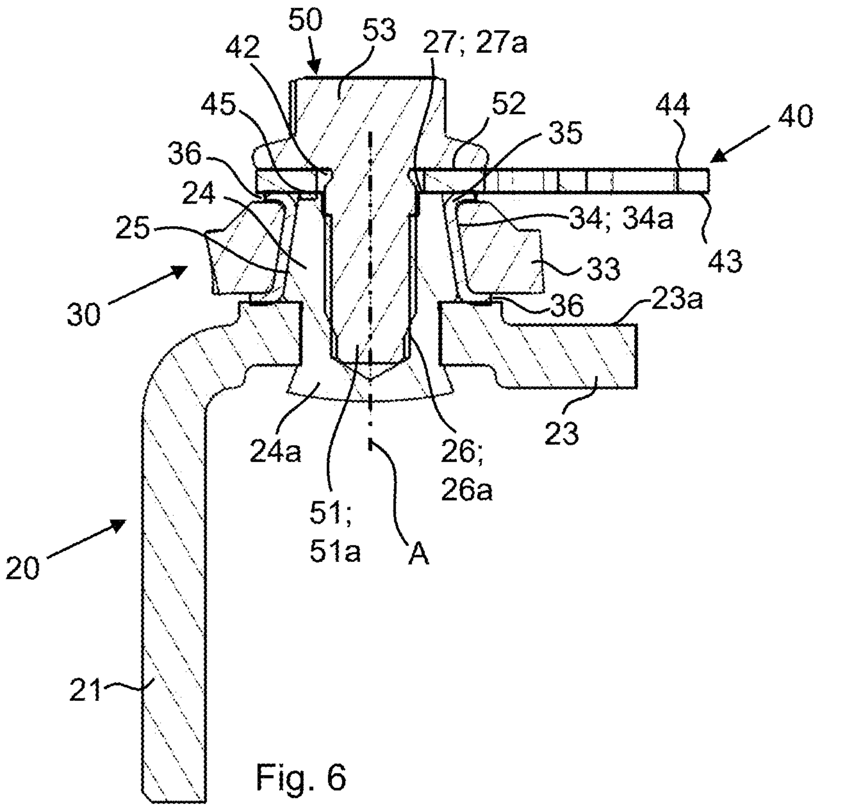
FIG. 6 is a sectional view along cut-line VI-VI of FIG. 5.

FIG. 6 shows a first sectional view VI-VI from FIG. 5, showing the threaded connection between the bolt 50 and the bearing portion 24 with the conical outside surface 25 of the first hinge member 20. It can also be seen that one projection 45 of the holder 40 is pressed into a front side of the material portion 27 of the ring surface 27*a* of the bearing portion 24, providing a frictional and form-fitting connection between the holder 40 and the first hinge member 20. As a result, all projections 45 are uniformly pressed into the softer material portion 27 of the bearing portion 24 of the first hinge member 20 via the contact force of the area 52 of the bolt 50, thereby plastically deforming the bearing portion 24.

The bushing 35 is arranged between the bearing portion 24 and the opening 34 of the second hinge part 30 to facilitate pivotal displacement of the second hinge member 30, wherein the bushing 35 is complementary with respect to the conical outside surface 25 of the bearing portion 24 of the first hinge member 20 and the conical opening 34*a* of the second hinge member 30. Furthermore, an axis of rotation A is clearly identifiable, about which the second hinge part 30 is rotatably displaceable.

Moreover, it can be distinctly identified that the holder 40 is arranged with its first side 43 spaced apart from the second hinge member 30 so that, when the second hinge member 30 is moved, no undesirable grinding and/or braking effect of the holder 40 with the cantilever 33 of the second hinge member 30 takes place, wherein a gap dimension 36 being approximately equal to a thickness of the bushing 35. Further, the first hinge member 20 is also spaced apart from the second hinge member 30, the gap dimension 36 being approximately equal to a thickness of the bushing 35, so that during a pivoting of the second hinge member 30 no undesired braking effect occurs.

Figure 7:
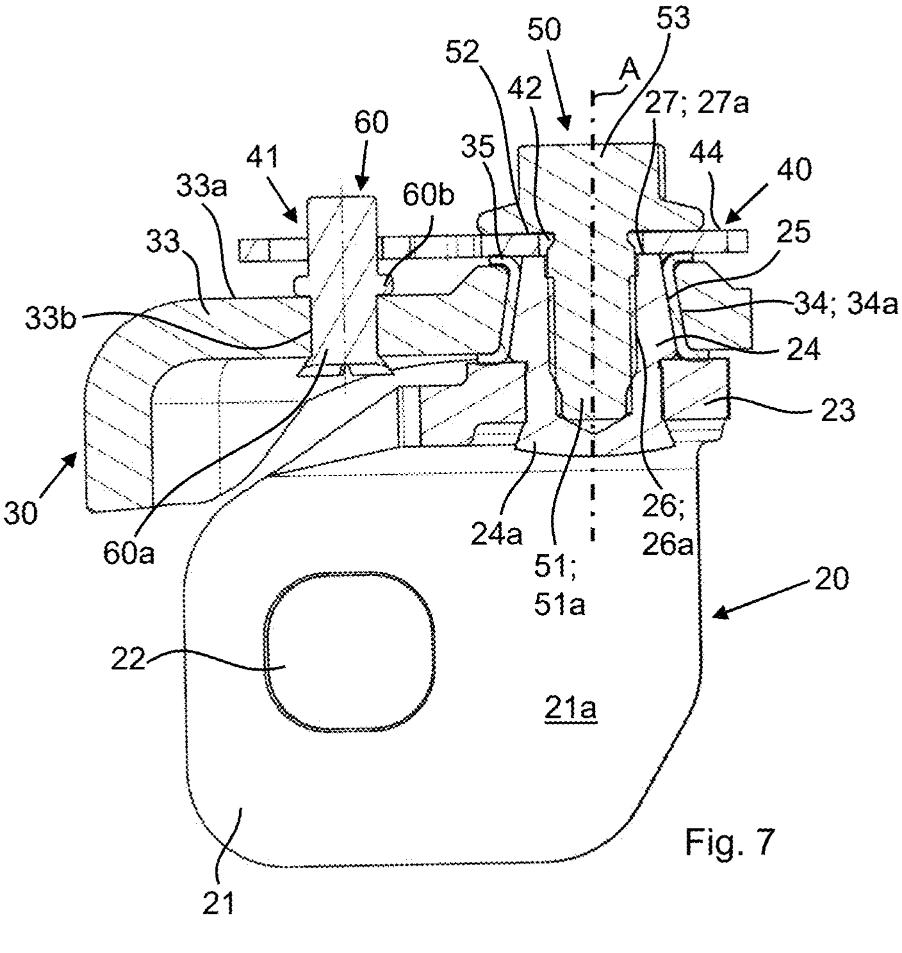
FIG. 7 is a sectional view along cut-line VII-VII of FIG. 5.

FIG. 7 shows a second sectional view VII-VII from FIG. 5, wherein the stop pin 60 is identifiable as being riveted with its fixing portion 60*a* to the cantilever 33 of the second hinge member 30, wherein the cantilever 33 has a bore hole 33*b*, in which the stop pin 60 is mounted. Furthermore, the stop pin 60 has a collar 60*b* which abuts the second plane 33*a* of the cantilever 33 of the second hinge member 30.

The subject matter of the present disclosure works as follows:

First, the eye 42 of the holder 40 is arranged concentrically with respect to a bore 26 of the bearing portion 24 of the first hinge member 20, with projections 45 of the first side 43 of the holder 40 facing the bearing portion 24 and more specifically facing the ring surface 27*a* of the bearing portion 24. Then, the holder 40 is set on the bearing portion with the projections 45, with the stop pin 60 to be received in the elongate hole 41.

Then, a bolt 50 with an external thread 51*a* is inserted into the eye 42 and screwed into the bore 26 of the bearing portion 24. The screw connection is preferably made using a torque wrench, with a tightening torque of 30 Nm. As a result, there is a releasable screw connection between the holder 40 and the bearing portion 24, with the bolt 50 pressing on the holder 40 and thus the projections 45 of the holder 40 pressing into the softer bearing portion 24. In this case, the holder 40 is connected to the bearing portion 24 by the bolt 50 in a force-locking manner by means of surface pressure. On the other hand, the projections 45 of the holder 40 are pressed into the bearing portion 24 like an embossing die so that the bearing portion 24 is at least partially plastically deformed by the projections 45 creating recesses in the bearing portion 24 in which the projections 45 of the holder 40 are arranged, thus producing a form-fitting connection between the holder 40 and the bearing portion 24 of the first hinge member 20, so that the holder 40 is attached to the bearing portion 24 of the first hinge member 20 in a rotationally fixed manner with a non-slip traction.

For removing the holder 40 after the successful painting work, the bolt 50 is screwed in the opposite direction, e.g. with the aid of an open-end wrench, and removed from the bore 26 of the first hinge member 20 and from the eye 42 of the holder 40. The holder 40 can thus be removed immediately from the automobile hinge 10, with the bolt 50 again being inserted into the bore 26 of the first hinge member 20 and screwed to the first hinge member 20 and to the second hinge member 30, so that there is a completed automobile hinge 10, and wherein the holder 40 is reusable for further working processes, so that material and costs can be saved.

The present disclosure has been explained above on the basis of an embodiment in which a holder 40 having projections 45 extending from the first side 43 of the holder 40 which press recesses in a ring surface 27*a* of the bearing portion 24 of the first hinge member 20. It has to be understood that the recesses in the bearing portion 24 can be formed in a separate step by a separate embossing tool before the attachment of the holder 40 to the bearing portion 24.

The present disclosure has been explained above on the basis of an embodiment in which a holder 40 having projections 45 extending from the first side 43 of the holder 40 which press in a ring surface 27*a* of the bearing portion 24 of the first hinge member 20. It has to be understood that the projections 45 can be formed as removable pins insertable into recesses of the holder.

Further, the opposite bearing portion can be provided with complementary recesses in which projections and/or pins of the holder are insertable to provide a rotationally fixed connection between the holder and the bearing portion.

The present disclosure has been explained above on the basis of an embodiment in which a holder 40 comprises a cylindrical eye 42. It has to be understood that the eye of the holder can have sectional wrench flats, such as being formed as an internal hexagon, with the opposing bearing portion of the first hinge member having complementary wrench flats, such as being formed as an external hexagon, to provide a form-fit connection between the holder and the bearing portion.

The present disclosure has been explained above on the basis of an embodiment in which a holder 40 made from a heat-treatable steel via a stamping process. It has to be understood that the holder 40 can be manufactured at least partially via a three-dimensional printing process.

The present disclosure has been explained above on the basis of an embodiment in which a threaded bolt 50 with a head 53 is used for a screw connection. It has to be understood that instead of the bolt a threaded rod can be used, which connects the holder and the first hinge member by means of a lower nut and an opposite upper nut, wherein the lower nut is assigned to the first hinge member and the upper nut is assigned to the holder, and wherein washers can be used.

The present disclosure has been explained above on the basis of an embodiment in which a holder 40 having projections 45 extending from the first side 43 of the holder 40 which press at least one recess in a ring surface 27*a* of a front side of the bearing portion 24 of the first hinge member 20. It has to be understood that the recess can be formed in the bearing portion 24 at least partially radially along the conical outside surface 25 of the bearing portion 24 by the holder 40.

The present disclosure has been explained above on the basis of an embodiment in which the first hinge member 20 comprises a conical bearing portion 24. It has to be understood that the first hinge member and the second hinge member can be coupled to each other via a cylindrical hinge pin having a cylindrical collar. The collar of the hinge pin is arranged between the first hinge member and the second hinge member, wherein the hinge pin is riveted to one of the first hinge member and second hinge member. Further, the hinge pin comprises an axial coupling section which extends beyond the first hinge member or beyond the second hinge member, wherein the coupling section comprises a bore with an internal thread, and wherein a holder is arrangeable on the coupling section, wherein an eye of the holder and the bore of the coupling section are arranged concentrically, and wherein a bolt is guided through the eye of the holder and into the bore to fasten the holder to the coupling section of the hinge pin with a defined tightening torque. As a result of the surface pressure of the bolt on the holder, projections of the holder press in a front face of the hinge pin to provide an anti-rotation connection of the holder with the hinge pin.

What is claimed is:

1. A retaining device for temporary use with a hinge having an axis of rotation, comprising a holder comprising a curved elongate hole and an eye, wherein the eye is configured to be concentrically aligned with the axis of rotation when the holder is positioned for use with the hinge, wherein the eye defines an inner circumference configured to receive a bolt defining the axis of rotation, wherein the holder is formed as a one-piece part, wherein the holder has a first side, wherein at least one projection extends from the first side of the holder, and wherein the at least one projection is arranged directly adjacent to the inner circumference of the eye.

2. The retaining device according to claim 1, wherein the at least one projection comprises a wall including a cylindrical portion forming an axial continuation of the inner circumferenial surface of the eye.

3. The retaining device according to claim 1, wherein said at least one projection of the holder comprises more than two projections, the projections being circumferentially arranged and evenly spaced from each other, each projections extending perpendicular from the first side and having a projection height measured along the axis of rotation, the projection height being between 0.1 mm to 1.0 mm.

4. The retaining device according to claim 1, wherein the first side including the at least one projection comprises at least one stamping surface configured to plastically deform a circumferentially extending ring surface of an opposing material portion of the hinge.

5. The retaining device according to claim 1, wherein the elongate hole comprises at least one cross-sectional constriction defining at least one holding position, and wherein at least one opening is formed between the elongate hole and the eye.

6. The retaining device according to claim 1, wherein the holder comprises a flat body having a second side opposite the first side, the second side facing away from a hinge member of the hinge, wherein the first side and the second side are arranged parallel to one another, and wherein the first side and the second side are connected to one another via an outer lateral portion.

7. The retaining device according to claim 1, wherein the holder comprises a sheet-metal stamping.

8. An automobile hinge comprising:

a first hinge member attachable to one of a body and a door of an automobile; and a second hinge member attachable to the other of the body and the door of said automobile; and a bolt which is connected to one of the first hinge member and the second hinge member in a rotationally fixed manner, wherein the other of said first hinge member and said second hinge member is pivotable about an axis of rotation defined by the bolt with respect to the one of said first hinge member and said second hinge member, wherein the other of said first hinge member and said second hinge member comprises at least one cantilever in which an opening is arranged, wherein a stop pin is arranged on a surface of the cantilever, wherein at least one projection of a retaining device for a temporary connection to a hinge is connectable to one of the first hinge member and the second hinge member in a rotationally fixed manner, and wherein the stop pin is accommodatable in a curved elongate hole of said retaining device in a movable manner.

9. The automobile hinge according to claim 8, wherein the one of said first hinge member and said second hinge member has an axial bearing portion with a conical outside surface, wherein the opening is configured as a conical opening which is complementary with respect to the conical outside surface and is connected in an articulated manner to the conical outside surface.

10. The automobile hinge according to claim 9, wherein the axial bearing portion with said conical outside surface comprises a bore with, at least in sections, an internal thread, into which the bolt having an external thread is screwed in a manner such that a shaft of said bolt passes through an eye of the retaining device, and wherein an area is assigned to a head of said bolt extending radially beyond the eye coupling in a rotationally fixed manner the at least one projection of the retaining device with the axial bearing portion in one of a force-locking and a form-locking manner.

11. The automobile hinge according to claim 8, wherein the retaining device for a temporary connection to a hinge comprises a holder assigned to one of said first hinge member and said second hinge member, wherein the holder comprises an eye, wherein said eye is concentrically arranged to the axis of rotation, wherein the eye comprises an inner circumference for receiving the bolt defining said axis of rotation, wherein the holder is configured as a one-piece part, wherein said holder is detachable from said one of said first hinge member and said second hinge member, wherein said holder having a first side facing said one of said first hinge member and said second hinge member, wherein the at least one projection extends from the first side of said holder, and wherein the at least one projection is arranged directly adjacent to the inner circumference of the eye of said holder.

12. The automobile hinge according to claim 8, wherein the retaining device is configured to be connected to one of said first hinge member and said second hinge member during a painting process for fixing an automobile door in at least one preferred opening position.

13. The automobile hinge according to claim 8, wherein the one of said first hinge member and said second hinge member comprises an axial bearing portion, and wherein the bearing portion comprises at least one material portion being plastically deformed by the at least one projection of the retaining device.

14. A method for temporarily connecting a retaining device to an automobile hinge, comprising the steps of:

arranging an eye of a holder of the retaining device concentrically to a bore of a bearing portion of a hinge member of the automobile hinge;

inserting a bolt through the eye and the bore and connecting the bolt to the bearing portion in a detachable manner; and applying a pre-adjustable force to the bolt to temporarily couple the holder to the bearing portion in a rotationally fixed manner, wherein the holder of the retaining device comprises at least one projection which penetrates into at least a material portion of the bearing portion of the hinge member, and wherein the at least one material portion of the bearing portion is plastically deformed by the at least one projection of the holder.

15. The method according to claim 14, wherein the bore of the bearing portion comprises an internal thread, wherein the bolt comprises an external thread, wherein said external thread of the bolt is complementary with respect to the internal thread of the bore of the bearing portion, and wherein the bolt is connectable to the bearing portion of the hinge member by applying a torque of between 10 Nm and 40 Nm.

16. The method according to claim 14, wherein the holder of the retaining device comprises a curved elongate hole, and wherein the eye is concentrically arranged to an axis of rotation of the automobile hinge, wherein the eye comprises an inner circumference for receiving the bolt, wherein the holder is configured as a one-piece part, wherein said holder is detachable from the automobile hinge, wherein said holder has a first side facing the hinge member, wherein at least one projection extends from the first side of said holder, and wherein the at least one projection is arranged directly adjacent to the inner circumference of the eye of said holder of the retaining device.

17. The method according to claim 14, wherein the automobile hinge comprises:

a first hinge member attachable to one of a body and a door of an automobile; and a second hinge member attachable to the other of the body and the door of said automobile; and wherein the bolt is connected to one of the first hinge member and the second hinge member in a rotationally fixed manner, wherein the other of said first hinge member and said second hinge member is pivotable about an axis of rotation defined by the bolt with respect to the one of said first hinge member and said second hinge member, wherein the other of said first hinge member and said second hinge member comprises at least one cantilever in which an opening is arranged, wherein a stop pin is arranged on a surface of the cantilever, wherein at least one projection of a retaining device for a temporary connection to a hinge is connectable to one of the first hinge member and the second hinge member in a rotationally fixed manner, and wherein the stop pin is accommodatable in an elongate hole of said retaining device in a movable manner.

18. The method according to claim 17, wherein the bearing portion is configured with a conical outside surface, wherein the opening is configured as a conical opening which is complementary with respect to the conical outside surface, and wherein the conical opening is connected in an articulated manner to the conical outside surface.

* * * * *